US012008116B2

(12) United States Patent
Chen

(10) Patent No.: US 12,008,116 B2
(45) Date of Patent: Jun. 11, 2024

(54) DEVICE AND METHOD FOR INCREASING THE SECURITY OF A DATABASE

(71) Applicant: Alibaba Group Holding Limited, Georgetown (KY)

(72) Inventor: Yuanmi Chen, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 40 days.

(21) Appl. No.: 17/402,010

(22) Filed: Aug. 13, 2021

(65) Prior Publication Data
US 2021/0374257 A1 Dec. 2, 2021

Related U.S. Application Data

(63) Continuation of application No. 16/189,906, filed on Nov. 13, 2018, now Pat. No. 11,120,142.

(30) Foreign Application Priority Data

Nov. 13, 2017 (CN) .......................... 201711116308.2

(51) Int. Cl.
G06F 21/60 (2013.01)
G06F 16/33 (2019.01)
G06F 16/903 (2019.01)
G06F 21/62 (2013.01)

(52) U.S. Cl.
CPC ........ G06F 21/602 (2013.01); G06F 16/3331 (2019.01); G06F 16/90344 (2019.01); G06F 21/6218 (2013.01)

(58) Field of Classification Search
CPC ............. G06F 16/90344; G06F 21/602; G06F 21/6218
See application file for complete search history.

(56) References Cited

U.S. PATENT DOCUMENTS

| 5,778,368 | A  | 7/1998  | Hogan et al.   |
|-----------|----|---------|----------------|
| 7,519,835 | B2 | 4/2009  | Koyfman        |
| 8,346,753 | B2 | 1/2013  | Hayes          |
| 8,365,247 | B1 | 1/2013  | Wiese et al.   |
| 8,819,408 | B2 | 8/2014  | Chiueh et al.  |
| 9,197,613 | B2 | 11/2015 | Chiueh et al.  |
| 9,454,673 | B1 | 9/2016  | Sarukkai et al.|
| 9,832,208 | B1 | 11/2017 | Adams et al.   |

(Continued)

FOREIGN PATENT DOCUMENTS

CN 106850187 6/2017

OTHER PUBLICATIONS

NPL Search Terms (Year: 2023).*

(Continued)

Primary Examiner — Syed A Zaidi

(57) ABSTRACT

A data processing method includes receiving a query word and in response to receiving the query word, searching a plurality of stored irreversibly encrypted substrings corresponding to the query word, where each of the plurality of stored irreversibly encrypted substrings is associated with a string of reversibly encrypted raw data. The data processing method further includes in response to searching, outputting one or more of the plurality of stored irreversibly encrypted substrings and the associated string of reversibly encrypted raw data corresponding to the query word as a query result.

20 Claims, 4 Drawing Sheets

(56) References Cited

U.S. PATENT DOCUMENTS

| | | | |
|---|---|---|---|
| 10,346,737 B1* | 7/2019 | Benitez | G06N 3/08 |
| 11,120,142 B2 | 9/2021 | Chen | |
| 2004/0117386 A1 | 6/2004 | Lavender et al. | |
| 2005/0071239 A1 | 3/2005 | Tormey et al. | |
| 2005/0193198 A1 | 9/2005 | Livowsky | |
| 2006/0212441 A1 | 9/2006 | Tang et al. | |
| 2007/0053513 A1 | 3/2007 | Hoffberg | |
| 2007/0130370 A1 | 6/2007 | Akaezuwa | |
| 2007/0276270 A1 | 11/2007 | Tran | |
| 2008/0004904 A1 | 1/2008 | Tran | |
| 2008/0133935 A1 | 6/2008 | Elovici et al. | |
| 2008/0301445 A1 | 12/2008 | Vasic et al. | |
| 2009/0083279 A1 | 3/2009 | Hasek | |
| 2009/0254567 A1 | 10/2009 | Fein et al. | |
| 2009/0299976 A1 | 12/2009 | Dexter | |
| 2009/0320141 A1 | 12/2009 | Wang et al. | |
| 2011/0004599 A1 | 1/2011 | Deninger et al. | |
| 2011/0040753 A1 | 2/2011 | Knight | |
| 2011/0173438 A1* | 7/2011 | Matzkel | H04L 9/14 |
| | | | 713/150 |
| 2012/0159180 A1 | 6/2012 | Chase et al. | |
| 2013/0159694 A1 | 6/2013 | Chiueh et al. | |
| 2013/0159695 A1 | 6/2013 | Chiueh et al. | |
| 2013/0238646 A1* | 9/2013 | Maro | G06F 21/6227 |
| | | | 707/E17.135 |
| 2014/0355754 A1 | 12/2014 | Leung et al. | |
| 2015/0356314 A1* | 12/2015 | Kumar | G06F 21/6245 |
| | | | 713/165 |
| 2016/0344707 A1* | 11/2016 | Philipp | H04L 63/06 |
| 2016/0357731 A1 | 12/2016 | Zorzin | |
| 2017/0060940 A1* | 3/2017 | Baessler | G06F 21/6227 |
| 2018/0293301 A1 | 10/2018 | Borate et al. | |

OTHER PUBLICATIONS

Storer, Mark W., et al. "Secure data deduplication." Proceedings of the 4th ACM international workshop on Storage security and survivability. 2008 (Year: 2008).*

NPL Search Terms (Year: 2024).*

* cited by examiner

DEVICE AND METHOD FOR INCREASING THE SECURITY OF A DATABASE

CROSS-REFERENCE TO RELATED APPLICATIONS

This application is a continuation of U.S. patent application Ser. No. 16/189,906, filed on Nov. 13, 2018, which claims priority to Chinese Patent Application No. 201711116308.2, filed on Nov. 13, 2017, the disclosure and content of each of which are incorporated herein by reference in their entireties.

BACKGROUND OF THE INVENTION

1. Field of the Invention

The present application relates to data processing and, in particular, to a device and method for increasing the security of data processing, e.g., a database.

2. Description of the Related Art

Currently, a database can be used for performing data storage tasks. When querying data from a database, one can use keywords as the basis for querying. In the prior art, when an encrypted storage is used, one cannot use sub string matching to query the storage content after a database is encrypted. This is because the data content is now represented as ciphertext. Therefore, an index dictionary can be pre-established for the ciphertext in the database. That is, indexes of keywords to each ciphertext are respectively established and saved in the index dictionary. During a keyword search process, the index dictionary is queried so as to further locate data having the keyword.

Another method used in the prior art is as follows: before a keyword search is conducted, all data in the database can be decrypted; and then a keyword search is performed on the basis that all the data is plain text.

SUMMARY OF THE INVENTION

The present invention provides a data processing method that substantially increases the security of a database or data structure. The method includes receiving a string of raw data, and partitioning the string of raw data to form a plurality of raw substrings. The method also includes irreversibly encrypting the plurality of raw substrings to form a plurality of irreversibly encrypted substrings. In addition, the method also includes reversibly encrypting the string of raw data to form a string of reversibly encrypted raw data. Further, the method includes associating the plurality of irreversibly encrypted substrings with the string of reversibly encrypted raw data such that each irreversibly encrypted substring is associated with the string of reversibly encrypted raw data. The method additionally includes storing the plurality of irreversibly encrypted substrings as a plurality of stored irreversibly encrypted substrings, and the string of reversibly encrypted raw data associated with each irreversibly encrypted substring as a stored reversibly encrypted string.

The present invention also includes a non-transitory computer-readable storage medium having embedded therein program instructions, which when executed by a processor, causes the processor to execute a method of data processing. The method includes receiving a string of raw data, and partitioning the string of raw data to form a plurality of raw substrings. The method also includes irreversibly encrypting the plurality of raw substrings to form a plurality of irreversibly encrypted substrings. In addition, the method also includes reversibly encrypting the string of raw data to form a string of reversibly encrypted raw data. Further, the method includes associating the plurality of irreversibly encrypted substrings with the string of reversibly encrypted raw data such that each irreversibly encrypted sub string is associated with the string of reversibly encrypted raw data. The method additionally includes storing the plurality of irreversibly encrypted substrings as a plurality of stored irreversibly encrypted substrings, and the string of reversibly encrypted raw data associated with each irreversibly encrypted substring as a stored reversibly encrypted string.

The present invention further includes a data device. The data device includes a memory that stores instructions and data in a data structure, and a processor coupled to the memory. The processor to receive a string of raw data, and partition the string of raw data to form a plurality of raw substrings. The processor to further irreversibly encrypt the plurality of raw substrings to form a plurality of irreversibly encrypted substrings. In addition, the processor to reversibly encrypt the string of raw data to form a string of reversibly encrypted raw data. Further, the processor to associate the plurality of irreversibly encrypted substrings with the string of reversibly encrypted raw data such that each irreversibly encrypted substring is associated with the string of reversibly encrypted raw data. The processor to additionally store the plurality of irreversibly encrypted substrings as a plurality of stored irreversibly encrypted substrings, and the string of reversibly encrypted raw data associated with each irreversibly encrypted substring as a stored reversibly encrypted string.

A better understanding of the features and advantages of the present invention will be obtained by reference to the following detailed description and accompanying drawings which set forth an illustrative embodiment in which the principals of the invention are utilized.

BRIEF DESCRIPTION OF THE DRAWINGS

The drawings described herein are provided for further understanding of the present application, and form a part of the present application. The exemplary embodiments of the present application and the description thereof are for explaining the present invention and do not constitute an undue limitation to the scope of the present invention.

DETAILED DESCRIPTION OF THE INVENTION

The technical solutions in the embodiments of the present application will be described clearly and completely below with reference to the drawings in the embodiments of the present application. It is apparent that the described embodiments are merely some, rather than all of the embodiments of the present application. All other embodiments obtained by those skilled in the art based on the embodiments in the present application without inventive efforts shall fall within the protection scope of the present application.

As described in greater detail below, the methods of data encryption, decryption, and query of the present invention can be applied to, for example, (1) encrypted storage and fuzzy query of data, (2) encryption and query of long text, and (3) encrypted storage and query of DNA (deoxyribonucleic acid) sequence fragments.

For example, in a relational database, the short text data in the database (e.g., sensitive fields and the like) that needs to be encrypted can be done directly using the data encryption method in the present application. After these sensitive fields have been encrypted, the encrypted sensitive fields can be queried with the query method of the present application. For example, a LIKE operator in Structured Query Language (SQL) can be used to retrieve a matching substring.

In addition, for the encryption and query of long text data, the long text data can first be partitioned using, for example, sliding window partitioning, to obtain a number of substrings. Following this, each substring is encrypted. In addition, each encrypted substring is located to determine a position of a certain substring appearing in the long text.

For the encrypted storage and query of a DNA sequence fragment, because the sequence is a string, the sequence string can be partitioned using, for example, sliding window partitioning, to obtain a number of subsequences. After this, each subsequence is then encrypted. Whether or not a specific fragment is present on an inputted DNA can then be determined so as to achieve medical purposes such as diagnosis. Because the inputted DNA is usually encrypted to ensure the privacy of the patient, the specific fragment can be encrypted with the present method so that the encrypted specific fragment can be used for the query.

Figure 1:
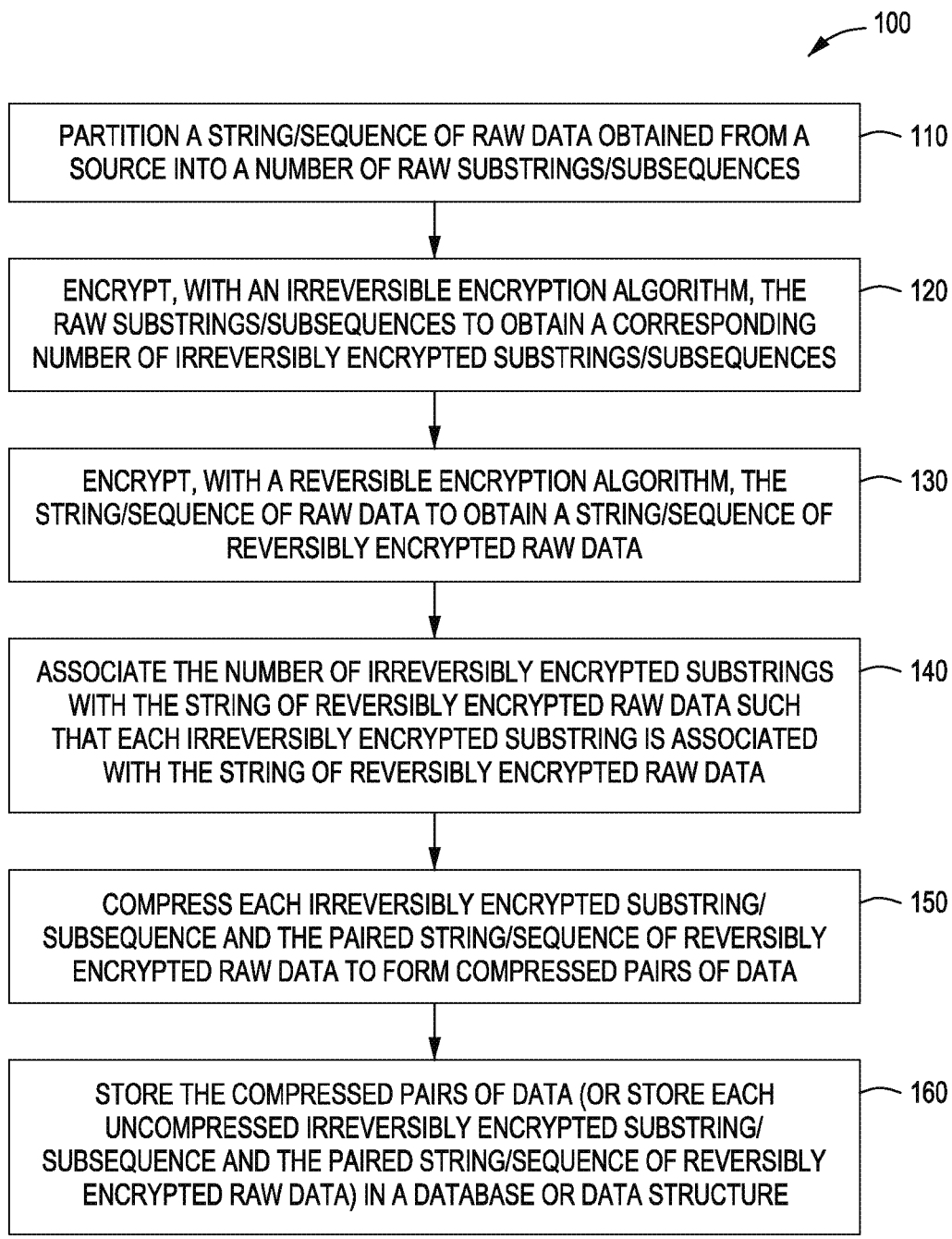
FIG. 1 is a flowchart illustrating an example of a method 100 of operating a database in accordance with the present invention.

FIG. 1 shows a flowchart that illustrates an example of a method 100 of operating a database in accordance with the present invention. As shown in FIG. 1, method 100 begins at step 110 by partitioning a string/sequence of raw data obtained from a source into a number of substrings/subsequences of raw data. In the present example, the source can be a database or other data structure, and the raw data can be data stored in and obtained from the database or other data structure. For example, if 100 pieces of address information are stored in a database, then the 100 pieces of address information are the to-be-encrypted raw data.

The string/sequence of raw data is partitioned into multiple substrings/subsequences of raw data according to a preset partitioning rule. For example, the preset partitioning rule can be a sliding window, and the foregoing 100 pieces of address information can be respectively partitioned into a series of sub-address information using a sliding window with a size x. The length of the sliding window can be either fixed or variable.

When a fixed-length sliding window is to be used to partition the data, the length of the sliding window is determined, and a string/sequence of raw data is partitioned, according to the fixed length of the sliding window, into a series of substrings/subsequences of raw data. Each substring/subsequence of raw data can include one or more pieces of raw data.

For example, assume that the string/sequence of raw data is "A, G, K, B, Z, N, E, K, S, W, H" and the length of the sliding window is four characters. In this case, the characters in the first sliding window are "A, G, K, B," and the characters in the second sliding window, which slides from left to right by one character, is "G, K, B, Z." Following the same line of reasoning, the characters in the third sliding window are "K, B, Z, N," and the characters in the rest of the sliding windows can be obtained following the same method. The partitioning of the raw data stops when the character in the last sliding window has been obtained.

Further, when the partitioned substrings/subsequences are subsequently encrypted, the four characters "A, G, K, B" in the first sliding window are encrypted to form an encrypted substring/subsequence "agkb." Similarly, the four characters "G, K, B, Z" in the second sliding window are encrypted to form an encrypted substring/subsequence "gkbz," and the characters "K, B, Z, N," in the third sliding window are encrypted to form an encrypted substring/subsequence "bbzn." The rest of the encrypted substrings/subsequences can be obtained using the same manner.

With respect to a variable sliding window, this type of window can include, for example, at least two Chinese characters, four English letters or numbers, or one Chinese character plus two English letters or numbers. Specifically, when raw data is partitioned according to a sliding window, assuming that a starting position of the sliding window is s and an ending position of the sliding window is e, then all the raw data, such as characters, between s and e (including the s position and the e position) is a window.

First, assuming that s=1 and e gradually increases from 1 until a minimum length requirement of the sliding window has been satisfied. The characters between s and e at this time are taken as a first window W(n), where n=1. Then, during sliding of the sliding window, if e is already the last character and the length of the window is not greater than the minimum length requirement, then the current window is already the last window and the partitioning of the raw data therefore stops.

Otherwise, n=n+1, and the $n^{th}$ window is calculated. If the current window satisfies the minimum length requirement, the next position after the window is not an alphanumeric, and the first position in the window is an alphanumeric, then s remains the same and e moves to the right by one character. Otherwise, s moves to the right by one character and e moves to the right until the window satisfies the minimum length requirement again, which is the next window W(n).

For example, if the string/sequence of raw data is "Y, 3, C, φ, ω, δ, A, θ, B, λ, β, C, C, C, ψ, μ, C," (where the Greek letters represent Chinese characters) (no space is included between any of the Chinese and English characters), then the substrings/subsequences are obtained by partitioning using a variable-length sliding window (the sliding window should have at least two Chinese characters, four English letters, or one Chinese character plus 2 English letters or numbers) are respectively: ["Y3Cφ"], ["3Cφ"], ["Cφω"], ["φω"], ["ωδ"], ["ωδA"], ["δAθ"], ["θBγ"], ["γβ"], ["γβC"], ["βCC"], ["βCCC"], ["CCCψ"], ["CCψ"], ["Cψμ"], ["ψμ"], and ["ψμC"]. No space is included between any Chinese and English characters in each partitioned sub string/subsequence.

TABLE 1

| Substring | Serial Number |
|---|---|
| Y3Cφ | 1 |
| 3Cφ | 2 |
| Cφω | 3 |

TABLE 1-continued

| Substring | Serial Number |
|---|---|
| Φω | 4 |
| Ωδ | 5 |
| ωδA | 6 |
| δAθ | 7 |
| AθB | 8 |
| θBλ | 9 |
| λβ | 10 |
| λβC | 11 |
| βCC | 12 |
| βCCC | 13 |
| CCCψ | 14 |
| CCψ | 15 |
| Cψμ | 16 |
| ψμ | 17 |
| ψμC | 18 |

As shown in Table 1, 18 substrings have been obtained by partitioning the string/sequence of raw data "Y, 3, C, φ, ω, δ, A, θ, B, λ, β, C, C, C, ψ, μ, C" according to a variable-length sliding window. In each substring/subsequence, an English character occupies one position, a Chinese character occupies two positions, and each sub string/sub sequence has a length of at least two Chinese characters, four English letters or numbers, or one Chinese character plus two English letters or numbers.

In practical applications, the length of the sliding window cannot be too short. If it is too short, the security of encrypting raw data can be compromised. If the sliding window is one character long, then step 110 would encrypt characters one by one. At the same time, the length of the sliding window cannot be too long. When a substring is queried, the sub string needs to be queried after being encrypted according to this embodiment.

A substring shorter than the length of the sliding window cannot be encrypted. Therefore, if the length of the sliding window is too long, it limits the minimum length the substrings might have. If the length of the sliding window is the length of the string/sequence of raw data, then step 110 directly encrypts the string/sequence of raw data rather than partitioning and encrypting substrings/subsequences. Following that, a query of substrings cannot be done subsequently.

In practical applications, the length of the sliding window is also related to the collision rate. In this case, a collision means that the same "encryption" results can be obtained with different substrings. The consequence of the collision is that when substring matching is performed, a result other than the desired query result can be output.

The collision rate is used to indicate the magnitude of a probability obtained for the outputted results different from the desired query results, and is explained below through theoretical calculations and experimental data. When encryption is performed by way of the embodiments of the present application, the collision rate is not particularly high. Thus, the case where too much data needs to be filtered out can be reduced.

A first experiment illustrates the effect of the length of the sliding window on the collision rate. When a theoretical collision rate is calculated, a mapping from N variables to M values may be considered, where N and M are respective integers greater than zero. Then if any variable is mapped, the probability obtained when there are k values (k is an integer greater than zero) colliding with it is as shown in equation (I):

$$\left(1-\frac{1}{M}\right)^{N-k} \cdot \left(\frac{1}{M}\right)^{K-1} \cdot \binom{N}{K-1} \cdot \frac{1}{K} \quad \text{Equation (I)}$$

Specifically, when k=1, i.e., one variable is mapped. The probability obtained when there is no collision is as shown in equation (II):

$$\left(1-\frac{1}{M}\right)^{N-1} \approx \left(\frac{1}{e}\right)^{N/M} \quad \text{Equation (II)}$$

When N/M is relatively small, this probability is relatively large.

In practical applications, assuming that a fixed sliding window is used with common Chinese characters and is two Chinese characters long. In the first experiment, considering combinations of every two adjacent Chinese characters of nearly 3,000 common Chinese characters, a total of 8.62 million substrings therefore exist, wherein each substring is two Chinese characters.

In the first experiment, the substrings with different compressed output windows are output, and the collision probability is calculated. When the length of the compressed output window is 3, 4, 5, and 6 bytes, respectively, the collision rates are shown in Table 2.

TABLE 2

| Compressed output bytes | Number of collisions (a total of 8.62 million Chinese characters, two words per unit) | Collision rate | Average number of collisions | Maximum number of collisions in 99.9% of cases (a total of 8.62 million Chinese characters, two words per unit) |
|---|---|---|---|---|
| 3 | 3.46 Million | 40.20% | 1.513 | 5 |
| 4 | 17313 | 0.200% | 1.002 | 2 |
| 5 | 66 | 0.00076% | 1.000 | 1 |
| 6 | 2 | 0.000022% | 1.000 | 1 |

Based on the content of Table 2, one can see that when the length of the output window is four bytes, the collision rate is already very low, and in 99.9% of the cases, at most two outputted results appear to collide with each other. When the length of the output window is five bytes and above, no collisions occur in 99.9% of the cases.

A second experiment also illustrates the effect of the length of the sliding window on the collision rate. In the second experiment, a variable-length sliding window is used and the substrings are a combination of Chinese characters with English letters. In the second experiment, the variability of the length of the sliding window is limited as follows: the sliding window can at least comprise no less than two Chinese characters or four letters or numbers.

Therefore, for a total of 25.39 million substrings, the substrings with different compressed output windows are outputted, which are 3, 4, 5, and 6 bytes long, respectively. The collision rate is calculated. When the number of output bytes are 3, 4, 5, and 6 respectively, the collision rates are shown in Table 3.

TABLE 3

| Compressed output bytes | Number of collisions (25.39 million pieces of data in total) | Collision rate | Average number of collisions | Maximum number of collisions in 99.9% of the cases (25.39 million pieces of data in total) |
|---|---|---|---|---|
| 3 | 19.81 million | 78.00% | 2.514 | 7 |
| 4 | 149435 | 0.589% | 1.006 | 2 |
| 5 | 622 | 0.00244% | 1.000 | 1 |
| 6 | 2 | 0.00000787% | 1.000 | 1 |

Based on the content of Table 3, one can see that when the length of the output window is four bytes, the collision rate is already very low, which is about 0.6%. In addition, in the case of the maximum number of conflicts in 99.9% of the cases, at most two outputted results appear to collide with each other. When the length of the output window is five bytes and above, no collisions occur in 99.9% of the cases.

Thus, in this embodiment, the length of the sliding window can be either fixed or variable as long as a substring compatibility property is satisfied. Herein, assuming that a sliding window output of a string T is W(T) and assuming that any of its matchable substrings t satisfies a requirement that the output W(t) of the sliding window is a substring of W(T), then it is considered that the sliding window has the substring compatibility.

Hence, the fixed-length sliding window obviously has the substring compatibility. In addition to the fixed-length sliding window, the variable-length sliding window can also be used. For example, the sliding window can include at least two Chinese characters, four English letters or numbers, or one Chinese character plus two English letters or numbers. Many variable sliding windows like this exist; and the use of one of them can also ensure the substring compatibility.

Referring again to FIG. 1, after partitioning the raw data, method 100 moves from step 110 to step 120 to encrypt, with an irreversible encryption algorithm, the number of substrings/subsequences of raw data to obtain a corresponding number of irreversibly encrypted substrings/subsequences. In this way, storage and query can be implemented on the basis of the irreversibly encrypted substrings/subsequences, thereby enhancing the security of data storage and query.

The irreversible encryption algorithm can be, for example, a hash algorithm having a key. For example, an "hmac algorithm" such as the "hmac AES" algorithm can be used to perform encryption. Each substring/subsequence of raw data could be encrypted using a hash encryption algorithm having a key so as to ensure that the encrypted data is un-decryptable. For example, if 100 pieces of address information exist and each piece of address information is partitioned by using a fixed-length sliding window to obtain 100 corresponding encrypted sets of data, each one of the 100 sets of data corresponding with each piece of address information.

It can be seen that in the embodiment of the present application, the string/sequence of raw data can be partitioned by using a preset partitioning rule to obtain multiple substrings/subsequences of raw data. For example, a fixed-length sliding window can be used to partition the raw data to obtain multiple windows of substrings/subsequences of raw data.

After this, the multiple substrings/subsequences of raw data are encrypted with an irreversible encryption algorithm to form multiple irreversibly encrypted substrings/subsequences. In this way, when the irreversibly encrypted substrings/subsequences are subsequently queried, the query word can be first partitioned by means of the sliding window, and then irreversibly encrypted so that an irreversibly encrypted sub-query word can directly query the irreversibly encrypted substrings/subsequences, thus ensuring the security of the raw data.

Following this, method 100 moves to step 130 to encrypt, according to a reversible encryption algorithm, the string/sequence of raw data (the same string/sequence of raw data that was obtained from a source and partitioned into a number of substrings/subsequences of raw data in step 110) to obtain a string/sequence of reversibly encrypted raw data.

Thus, in this embodiment, in addition to irreversibly encrypting each substring/subsequence of raw data using a hash algorithm having a key, a reversible encryption algorithm is also used to directly encrypt the raw data, thereby obtaining a string/sequence of reversibly encrypted raw data. In practical applications, each irreversibly encrypted sub string/subsequence is paired with the string/sequence of reversibly encrypted raw data to form final output data. The reversible encryption algorithm used in this step can be, for example, an AES128 algorithm or the like, as long as it is a de-cryptable encryption algorithm.

After this, method 100 moves to step 140 to associate the number of irreversibly encrypted substrings/subsequences with the string of reversibly encrypted raw data such that each irreversibly encrypted substring/subsequence is associated with the string of reversibly encrypted raw data.

With the above method, the raw data is partitioned into multiple substrings/subsequences, which are then irreversibly encrypted to form multiple irreversibly encrypted substrings/subsequences. In addition, the raw data is also reversibly encrypted to form a string/sequence of reversibly encrypted raw data. The multiple irreversibly encrypted substrings/subsequences and the string/sequence of reversibly encrypted raw data are spliced together to form multiple final output data sets where each irreversibly encrypted substring/subsequence is paired with the string/sequence of reversibly encrypted raw data to form final output data.

After this, method 100 moves to step 150 to compress each irreversibly encrypted substring/subsequence and the paired string/sequence of reversibly encrypted raw data to form compressed pairs of data. In practical applications, since an irreversibly encrypted substring/subsequence and the paired string/sequence of reversibly encrypted raw data can be relatively large, the output length of hash encryption is generally 128 bits. A compression algorithm can be used to reduce the output data to a shorter length.

In this step, the compression algorithm can adopt a deflate algorithm such as gzip, zlib, or a graphic format png, as long as the irreversibly encrypted substring/subsequence and the paired string/sequence of reversibly encrypted raw data can be compressed and the overall output data has a shorter length. The compression algorithm is not limited in the embodiment of the present application. The embodiment of the present application further provides a data storage device that can be used for storing each irreversibly encrypted substring/subsequence and the paired string/sequence of reversibly encrypted raw data.

After compression, which is a preferred but optional step, method 100 moves to step 160 to store the compressed pairs of data (or store each uncompressed irreversibly encrypted substring/subsequence and the paired string/sequence of reversibly encrypted raw data when method 100 moves directly from step 140 to step 160) in a database or data structure.

With the above method, a string/sequence of raw data is first partitioned into multiple substrings/subsequences of raw data, and then irreversibly encrypted to form multiple irreversibly encrypted substrings/subsequences. In addition, the string/sequence of raw data is also reversibly encrypted to form a string/sequence of reversibly encrypted raw data. Following this, each irreversibly encrypted substring/subsequence is paired with the string/sequence of reversibly encrypted raw data, and stored as an associated pair.

A search query is also partitioned and irreversibly encrypted to form irreversibly encrypted sub-queries, with an irreversibly encrypted sub-query used to locate a matching stored irreversibly encrypted substring/subsequence. Once a matching stored irreversibly encrypted substring/subsequence has been found, the matching stored irreversibly encrypted substring/subsequence and the associated string/sequence of reversibly encrypted raw data can be output in response to the query, where the recipient can decrypt the reversibly encrypted string/sequence.

Figure 2:
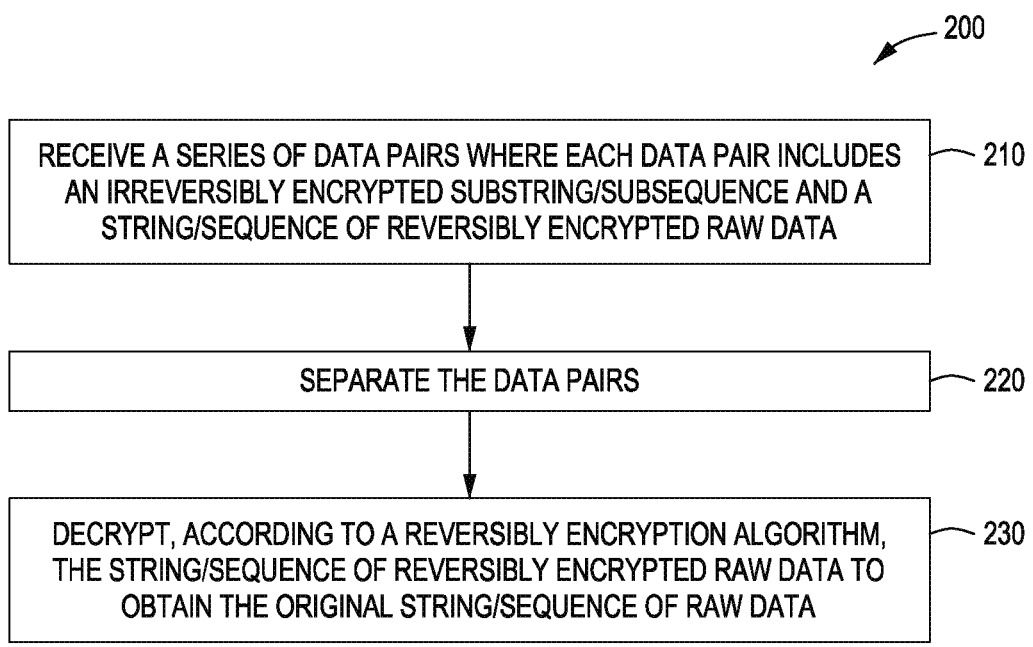
FIG. 2 is a flowchart illustrating an example of a method 200 of operating a client device in accordance with the present invention.

FIG. 2 shows a flowchart that illustrates an example of a method 200 of operating a client device in accordance with the present invention. As shown in the FIG. 2 example, method 200 begins at step 210 by receiving a series of data pairs where each data pair includes an irreversibly encrypted substring/subsequence and a string/sequence of reversibly encrypted raw data (and decompressing the series of data pairs when compressed) in response to a submitted search query.

After this, method 200 moves to step 220 to separate the data pairs, and then step to step 230 to decrypt, according to a reversible encryption algorithm, the string/sequence of reversibly encrypted raw data to obtain the original string/sequence of raw data. In this embodiment, the irreversibly encrypted substrings/subsequences are un-de-cryptable. Therefore, only the string/sequence of reversibly encrypted raw data is decrypted to obtain the original string/sequence of raw data.

Figure 3:
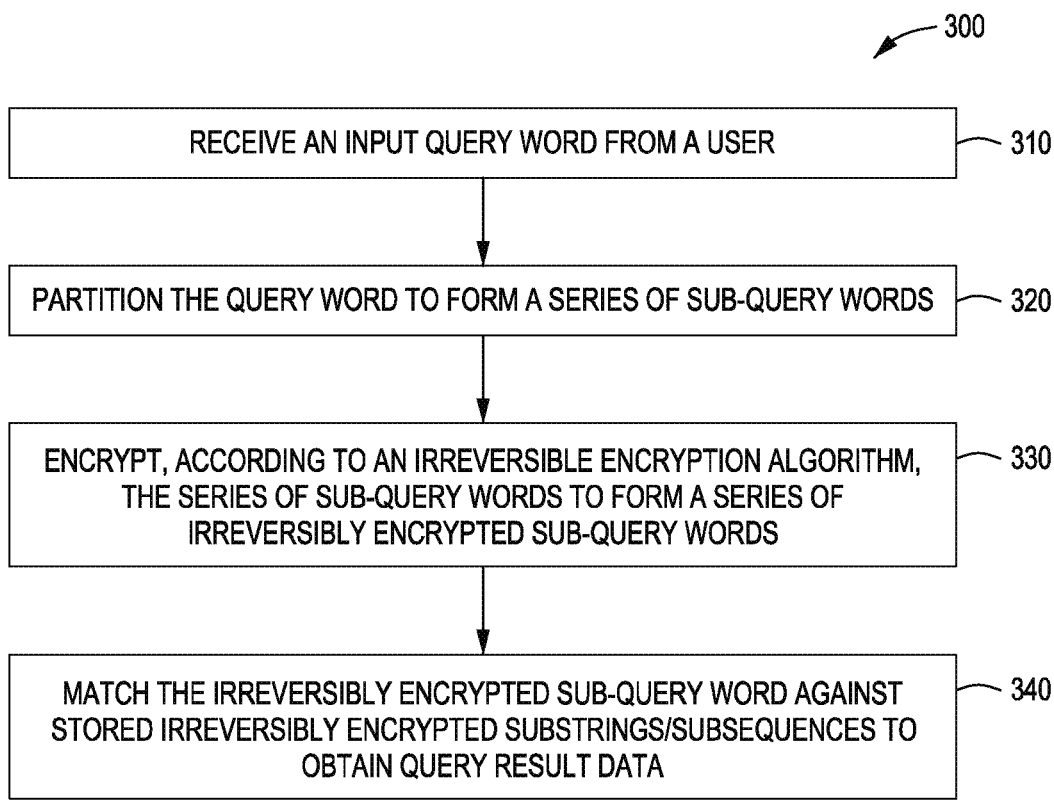
FIG. 3 is a flowchart illustrating an example of a method 300 of querying a database in accordance with the present invention.

FIG. 3 shows a flowchart that illustrates an example of a method 300 of querying a database in accordance with the present invention. As shown in the FIG. 3, example, method 300 begins at step 310 by receiving an input query word from a user. For example, if the user inputs "Hangzhou City", then the query word is "Hangzhou City."

After receiving the query word, method 300 moves to step 320 to partition the query word to form a series of sub-query words. The query word is partitioned according to the size of the fixed sliding window used when partitioning the raw data as described in method 100. For example, if the size of the fixed sliding window is two Chinese characters, then "ωλφ" is partitioned into two substrings that include "ωλ" and "λφ."

Following this, method 300 moves to step 330 to encrypt, according to an irreversible encryption algorithm, the series of sub-query words to form a series of irreversibly encrypted sub-query words. The irreversible encryption of the sub-query words is performed with the same irreversible encryption algorithm used for irreversibly encrypting the substrings/subsequences obtained from partitioning the string/sequence of raw data. For example, a hash encryption algorithm having a key can be used. In the present example, the two substrings "ωλ" and "λφ" are irreversibly encrypted.

Method 300 next moves to step 340 to match the irreversibly encrypted sub-query word against stored irreversibly encrypted substrings/subsequences to obtain query result data. The stored irreversibly encrypted substrings/subsequences are obtained by partitioning a string/sequence of raw data into a series of substrings/subsequences, and then irreversibly encrypting the substrings/subsequences with an irreversible encryption algorithm. In this step, an ordinary string matching algorithm can be used to match the irreversibly encrypted sub-query word against the stored irreversibly encrypted substrings/subsequences. The matching results are used as the query result data.

Figure 4:
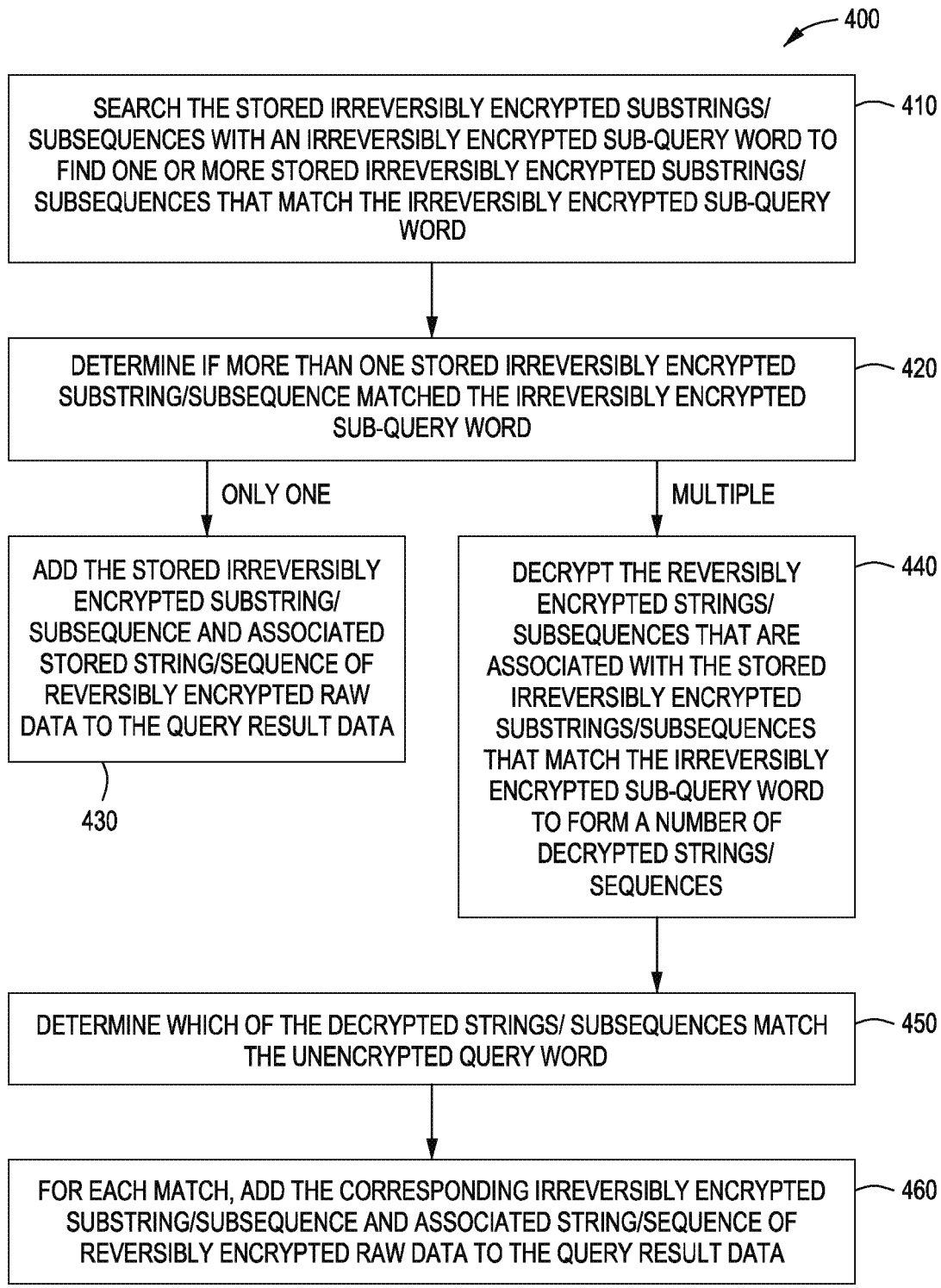
FIG. 4 is a flowchart illustrating an example of a method 400 of implementing step 340 in accordance with the present invention.

FIG. 4 shows a flowchart that illustrates an example of a method 400 of implementing step 340 in accordance with the present invention. As shown in FIG. 4, method 400 begins at step 410 where the stored irreversibly encrypted substrings/subsequences are searched with an irreversibly encrypted sub-query word to find one or more stored irreversibly encrypted substrings/subsequences that match the irreversibly encrypted sub-query word.

After the stored irreversibly encrypted substrings/subsequences that match the irreversibly encrypted sub-query word have been identified, method 400 moves to step 420 to determine if more than one stored irreversibly encrypted sub string/sub sequence matched the irreversibly encrypted sub-query word. When only one stored irreversibly encrypted substring/subsequence matches the irreversibly encrypted sub-query word, method 400 moves to step 430 to add the stored irreversibly encrypted substring/subsequence and associated stored string/sequence of reversibly encrypted raw data to the query result data.

When more than one stored irreversibly encrypted substring/subsequence matches the irreversibly encrypted sub-query word, method 400 moves to step 440 to decrypt the strings/sequences of reversibly encrypted raw data associated with the stored irreversibly encrypted substrings/subsequences that match the irreversibly encrypted sub-query word to form a number of decrypted strings/sequences.

Following this, method 400 moves to step 450 to determine which of the decrypted strings/sequences match the unencrypted query word. Method 400 then moves to step 460 where, for each match, method 400 adds the corresponding irreversibly encrypted substring/subsequence and associated string/sequence of reversibly encrypted raw data to the query result data.

For example, if there are five stored strings/sequences of reversibly encrypted raw data that are associated with five stored irreversibly encrypted substrings/subsequences that match an irreversibly encrypted sub-query word, then the five stored strings/sequences of reversibly encrypted raw data are decrypted to obtain five decrypted strings/sequences of raw data. The five decrypted strings/sequences of raw data are then matched against the unencrypted query word that was partitioned to form the sub-query words.

If it is found that all of the five decrypted strings/sequences of raw data are matched, it indicates that the five decrypted strings/sequences of raw data are all successfully verified. If it is found that four decrypted strings/sequences of raw data are not matched, it indicates that the four decrypted strings/sequences of raw data did not pass verification.

If all of the five decrypted strings/sequences of raw data are successfully verified, then they are all used as the query result data. If four decrypted strings/sequences of raw data do not pass the verification and one does, then the remaining one decrypted string/sequence of raw data is used as the query result data.

In this embodiment, when data encryption is performed, raw data is first partitioned into a number of sub-data units according to a preset partitioning rule, e.g., the length of each sub-data unit is the same. Each partitioned sub-data unit is then irreversibly encrypted and stored as stored irreversibly encrypted sub-data unit. A hash encryption algorithm having a key can be used to irreversibly encrypt the sub-data unit.

Moreover, during a subsequent query, a query word is first partitioned into sub-query words according to the same preset partitioning rule, irreversibly encrypted, and then the irreversibly encrypted sub-query words are matched against stored irreversibly encrypted sub-data units, thereby implementing an encrypted query. Compared with the prior art, the querying data technique according to the present invention has high security.

Moreover, encryption is also performed once on the raw data according to a reversible encryption algorithm to form a reversibly encrypted data unit. When it is necessary to verify whether a matching irreversibly encrypted sub-data unit is accurate, the associated reversibly encrypted data unit can be decrypted and compared to the corresponding unencrypted query word to be directly verified and implement the filtering of the unwanted data, thereby ensuring the accuracy of query results. Furthermore, compared with the prior art, the method of the present invention does not need to decrypt all the reversibly encrypted sub-data units, and does not include an index dictionary established additionally. The query efficiency is also improved, and the storage space taken by the index dictionary is saved at the same time.

In practical applications, it should be further noted that if the query method is applied to a terminal, then after receiving a data query request of a user, the terminal sends to a server a query word included in the data query request. The server searches for the query word according to the method as shown in FIG. 4, and returns query results to the terminal. The terminal then displays the query results on a query result page.

In order to describe each foregoing method embodiment in a concise manner, all the method embodiments have been described as a combination of a series of actions; but those skilled in the art should know that the present application is not limited by the sequence of the described actions. Certain steps can be applied with different sequences or can be carried out at the same time according to the present application. Secondly, those skilled in the art should also know that all the embodiments described in the description belong to preferred embodiments. The related actions and modules are not necessarily needed for the present application.

Figure 5:
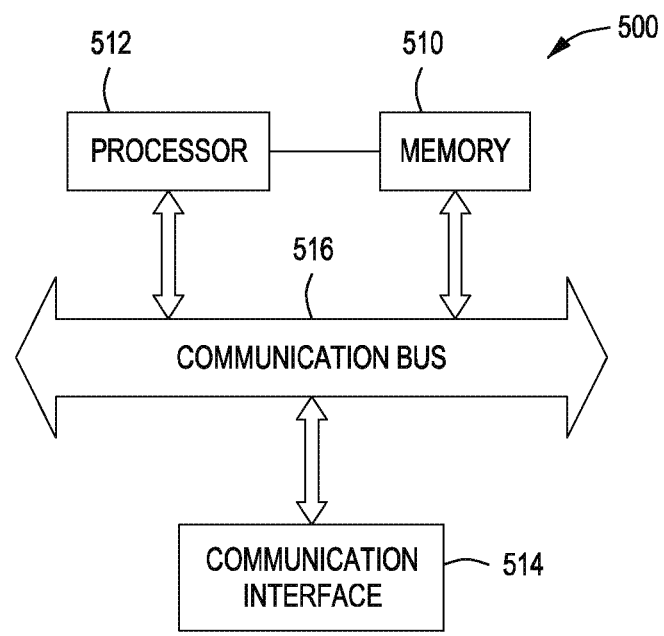
FIG. 5 is a block diagram illustrating a data device 500 in accordance with the present invention.

FIG. 5 shows a block diagram that illustrates a data device 500 in accordance with the present invention. As shown in FIG. 5, device 500 includes a memory 510 that stores instructions and data in a database or data structure, a processor 512 coupled to memory 510, and a communication interface 514, which is connected to processor 512 via a communication bus 516.

In operation, processor 512 partitions raw data into sub-data units, such as with a sliding window, irreversibly encrypts the sub-data units to form irreversibly encrypted sub-data units, reversibly encrypts the raw data to form a reversibly encrypted data unit, and stores each irreversibly encrypted sub-data unit and the reversibly encrypted data unit as associated pairs. Processor 512 can be further configured to compress the irreversibly encrypted sub-data units and the associated reversibly encrypted data unit.

Communication interface 514 receives to-be-decrypted data (reversibly encrypted data unit). Processor 512 decrypts, according to the reversible encryption algorithm, the reversibly encrypted data unit to obtain raw data, and determines the raw data and the irreversibly encrypted sub-data as decrypted data.

Communication interface 514 also receives an input query word. Processor 512 encrypts, according to an irreversible encryption algorithm, the query word to obtain an encrypted query word, and matches the encrypted query word against stored encrypted data to obtain query result data. The stored encrypted data can be obtained by partitioning raw data into sub-data units, and encrypting the sub-data units with the irreversible encryption algorithm.

Processor 512 irreversibly encrypts, with an irreversible encryption algorithm, the query word to obtain an encrypted query word by determining a fixed length needing to be partitioned, partitioning, according to the fixed length, the query word into at least one sub-query word, and encrypting, according to the irreversible encryption algorithm, the at least one sub-query word to obtain encrypted sub-query words.

In addition, processor 512 matches the encrypted query word against encrypted data to obtain query result data by matching the encrypted query word against the stored encrypted data to obtain matching target sub-data, using the raw data corresponding to the target sub-data as reference data to verify the target sub-data, and using successfully verified target sub-data as the query result data.

Further, processor 512 uses the raw data corresponding to the target sub-data as reference data to verify the target sub-data by obtaining at least one piece of target data to which the target sub-data belongs, decrypting the at least one piece of target data to obtain at least one piece of raw data corresponding to the at least one piece of target data, and using a determination result as to whether the query word matches the at least one piece of raw data as a verification result of the encrypted data.

Figure 6:
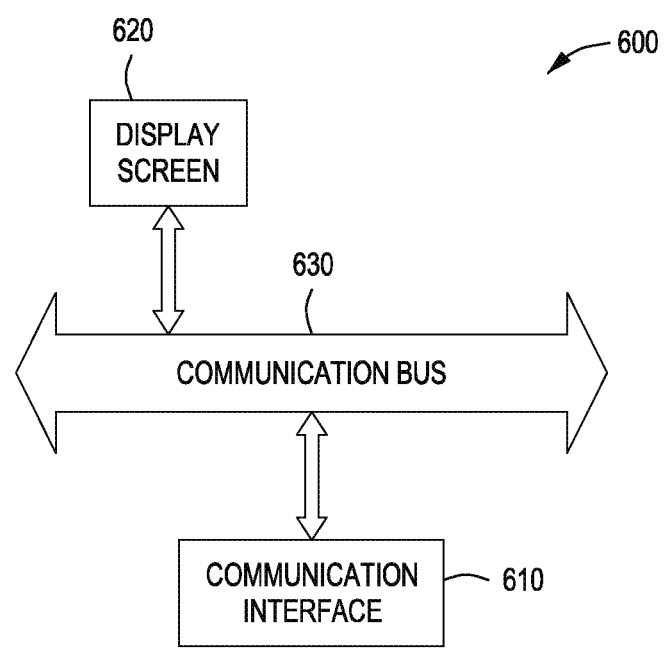
FIG. 6 is a block diagram illustrating a data device 600 in accordance with the present invention.

FIG. 6 shows a block diagram that illustrates a data device 600 in accordance with the present invention. As shown in FIG. 6, device 600 includes a communication interface 610 that receives a data query request of a user, sends to a server a query word included in a data obtaining request, and receives query results returned by the server, wherein the query results are obtained by: encrypting, according to an irreversible encryption algorithm, the query word to obtain an encrypted query word, and matching the encrypted query word against encrypted data to obtain query result data.

Device 600 also includes a display screen 620, which is coupled to communication interface 610 via a communication bus 630, that displays the query result data on a result page, wherein the encrypted data is obtained by partitioning raw data into sub-data, and encrypting the sub-data with the irreversible encryption algorithm.

The embodiment of the present application further discloses a computer-readable medium which has stored thereon a program for enabling a computer to perform data encryption. The data encryption includes a partitioning step: partitioning raw data into sub-data units, and an encryption step: encrypting, with an irreversible encryption algorithm, the sub-data units to obtain encrypted sub-data units.

The embodiment of the present application further discloses a computer-readable medium which has stored thereon a program for enabling a computer to perform data decryption. The data decryption includes a receiving step: receiving to-be-decrypted data. The to-be-decrypted data including target data encrypted with a reversible encryption algorithm and encrypted sub-data. The data decryption also includes a decryption step: decrypting, according to the reversible encryption algorithm, the target data to obtain raw data, and a determination step: determining the raw data and the encrypted sub-data as decrypted data.

The embodiment of the present application further discloses a computer-readable medium which has stored thereon a program for enabling a computer to perform a data query. The data query includes a receiving step: receiving an inputted query word, an encryption step: encrypting, according to an irreversible encryption algorithm (the query word to obtain an encrypted query word), and a matching step: matching the encrypted query word against encrypted data to obtain query result data. The encrypted data is obtained by: partitioning raw data into sub-data; and encrypting the sub-data with the irreversible encryption algorithm.

The embodiment of the present application further discloses a computer-readable medium which has stored thereon a program for enabling a computer to perform a data query. The data query includes a sending step: sending to a server a query word included in a data obtaining request after receiving a data query request of a user, and a receiving step: receiving query results returned by the server and displaying the query results on a result page.

The query results are obtained by: encrypting, according to an irreversible encryption algorithm (the query word to obtain an encrypted query word), and matching the encrypted query word against encrypted data to obtain query result data. The encrypted data is obtained by: partitioning raw data into sub-data, and encrypting the sub-data with the irreversible encryption algorithm.

It should be noted that the embodiments in the specification are described progressively with each embodiment emphasizing a part different from other embodiments. Identical or similar parts of the embodiments may be obtained by referring to one another. Because the device embodiments are substantially similar to the method embodiments, the description for the device embodiments is relatively concise, and reference can be made to the description of the method embodiments for related parts.

Finally, it should be further noted that in this text, the relation terms such as first and second are merely used to distinguish one entity or operation from another entity or operation, and do not require or imply that the entities or operations have this actual relation or order. Moreover, the terms "include," "comprise," or other variations thereof are intended to cover non-exclusive inclusion, so that a process, a method, an article, or a device including a series of elements not only includes the elements, but also includes other elements not clearly listed, or further includes inherent elements of the process, method, article, or device. The element defined by the statement "including one," without further limitation, does not preclude the presence of additional identical elements in the process, method, commodity, or device that includes the element.

The data encryption, decryption and query methods provided in the present application are introduced above in detail. The principles and implementation manners of the present application are set forth herein with reference to specific examples. Descriptions of the above embodiments are merely served to assist in understanding the method and the essential ideas of the present application. Those of ordinary skill in the art may make changes to specific implementation manners and application scopes according to the ideas of the present application. In view of the above, the content of the description should not be construed as limiting the present application.

What is claimed is:

1. A data processing method, comprising:
    receiving a query word;
    partitioning the query word to form a plurality of sub-query words based on a length of a sliding window;
    in response to receiving the query word and partitioning the query word, searching a plurality of stored irreversibly encrypted substrings corresponding to the plurality of sub-query words, wherein each of the plurality of stored irreversibly encrypted substrings is associated with a string of reversibly encrypted raw data, and wherein the length of the sliding window is determined based on a collision rate of the plurality of stored irreversibly encrypted substrings; and
    in response to searching, outputting one or more of the plurality of stored irreversibly encrypted substrings and the associated string of reversibly encrypted raw data corresponding to the plurality of sub-query words as a query result.

2. The data processing method of claim 1, further comprising:
    irreversibly encrypting the plurality of sub-query words to form a plurality of irreversibly encrypted sub-query words.

3. The data processing method of claim 2, wherein searching the plurality of stored irreversibly encrypted substrings corresponding to the query word comprises matching the plurality of irreversibly encrypted sub-query words with the plurality of stored irreversibly encrypted substrings, and
    wherein outputting the one or more of the plurality of stored irreversibly encrypted substrings and the associated string of reversibly encrypted raw data corresponding to the query word comprises outputting one or more of the plurality of stored irreversibly encrypted substrings and the associated string of reversibly encrypted raw data that match the plurality of irreversibly encrypted sub-query words as the query result.

4. The data processing method of claim 3, further comprising:
    decrypting the string of reversibly encrypted raw data associated with the plurality of stored irreversibly encrypted substrings matching the plurality of irreversibly encrypted sub-query words, to form a plurality of decrypted strings when more than one irreversibly encrypted substrings from the plurality of stored irreversibly encrypted substrings are output;
    determining decrypted strings, from the plurality of decrypted strings, which match an unencrypted query word; and
    for each match, adding the corresponding irreversibly encrypted substring and associated reversibly encrypted string to the query result.

5. The data processing method of claim 1, wherein the plurality of stored irreversibly encrypted substrings is formed by: partitioning a string of raw data that is obtained from a source to form a plurality of raw substrings, and irreversibly encrypting the plurality of raw substrings.

6. The data processing method of claim 5, wherein the string of raw data is partitioned using the sliding window.

7. The data processing method of claim 1, wherein the query word is partitioned using the sliding window.

8. A non-transitory computer-readable storage medium having embedded therein program instructions, which when executed by a processor, causes the processor to execute a method of data processing, the method comprising:
    receiving a query word;
    partitioning the query word to form a plurality of sub-query words based on a length of a sliding window;
    in response to receiving the query word and partitioning the query word, searching a plurality of stored irreversibly encrypted substrings corresponding to the plurality of sub-query words, wherein each of the plurality of stored irreversibly encrypted substrings is associated with a string of reversibly encrypted raw data, and wherein the length of the sliding window is determined based on a collision rate of the plurality of stored irreversibly encrypted substrings; and in response to searching, outputting one or more of the plurality of stored irreversibly encrypted substrings and the associated string of reversibly encrypted raw data corresponding to the plurality of sub-query words as a query result.

9. The non-transitory computer-readable storage medium of claim 8, wherein the method further comprises:
irreversibly encrypting the plurality of sub-query words to form a plurality of irreversibly encrypted sub-query words.

10. The non-transitory computer-readable storage medium of claim 9, wherein searching the plurality of stored irreversibly encrypted substrings corresponding to the query word comprises matching the plurality of irreversibly encrypted sub-query words with the plurality of stored irreversibly encrypted substrings, and
wherein outputting the one or more of the plurality of stored irreversibly encrypted substrings and the associated string of reversibly encrypted raw data corresponding to the query word comprises outputting one or more of the plurality of stored irreversibly encrypted substrings and the associated string of reversibly encrypted raw data that match the plurality of irreversibly encrypted sub-query words as the query result.

11. The non-transitory computer-readable storage medium of claim 10, wherein the method further comprises:
decrypting the string of reversibly encrypted raw data associated with the plurality of stored irreversibly encrypted substrings matching the plurality of irreversibly encrypted sub-query words, to form a plurality of decrypted strings when more than one irreversibly encrypted substrings from the plurality of stored irreversibly encrypted substrings are output;
determining decrypted strings, from the plurality of decrypted strings, which match an unencrypted query word; and
for each match, adding the corresponding irreversibly encrypted substring and associated reversibly encrypted string to the query result.

12. The non-transitory computer-readable storage medium of claim 8, wherein the plurality of stored irreversibly encrypted substrings is formed by: partitioning a string of raw data that is obtained from a source to form a plurality of raw substrings, and irreversibly encrypting the plurality of raw substrings.

13. The non-transitory computer-readable storage medium of claim 12, wherein the string of raw data is partitioned using the sliding window.

14. The non-transitory computer-readable storage medium of claim 8, wherein the method further comprises wherein the query word is partitioned using the sliding window.

15. A data device, comprising:
a memory that stores instructions and data in a data structure; and
a processor coupled to the memory, the processor to:
receive a query word;
partition the query word to form a plurality of sub-query words based on a length of a sliding window;
in response to the receipt of the query word and the partitioned query word, search a plurality of stored irreversibly encrypted substrings corresponding to the plurality of sub-query words, wherein each of the plurality of stored irreversibly encrypted substrings is associated with a string of reversibly encrypted raw data, and wherein the length of the sliding window is determined based on a collision rate of the plurality of stored irreversibly encrypted substrings; and
in response to the search, output one or more of the plurality of stored irreversibly encrypted substrings and the associated string of reversibly encrypted raw data corresponding to the plurality of sub-query words as a query result.

16. The data device of claim 15, wherein the processor to further:
irreversibly encrypt the plurality of sub-query words to form a plurality of irreversibly encrypted sub-query words.

17. The data device of claim 16, wherein to search the plurality of stored irreversibly encrypted substrings corresponding to the query word, the processor is to match the plurality of irreversibly encrypted sub-query words with the plurality of stored irreversibly encrypted substrings, and
wherein to output the one or more of the plurality of stored irreversibly encrypted substrings and the associated string of reversibly encrypted raw data corresponding to the query word, the processor is to output one or more of the plurality of stored irreversibly encrypted substrings and the associated string of reversibly encrypted raw data that match the plurality of irreversibly encrypted sub-query words as the query result.

18. The data device of claim 17, wherein the processor to further:
decrypt the string of reversibly encrypted raw data associated with the plurality of stored irreversibly encrypted substrings matching the plurality of irreversibly encrypted sub-query words, to form a plurality of decrypted strings when more than one irreversibly encrypted substrings from the plurality of stored irreversibly encrypted substrings are output;
determine decrypted strings, from the plurality of decrypted strings, which match an unencrypted query word; and
for each match, add the corresponding irreversibly encrypted substring and associated reversibly encrypted string to the query result.

19. The data device of claim 15, wherein the plurality of stored irreversibly encrypted substrings is formed by partitioning a string of raw data that is obtained from a source to form a plurality of raw substrings, and irreversibly encrypting the plurality of raw substrings.

20. The data device of claim 19, wherein the string of raw data is partitioned using the sliding window.

* * * * *